(12) United States Patent
Yu et al.

(10) Patent No.: US 9,629,158 B2
(45) Date of Patent: Apr. 18, 2017

(54) FREQUENCY ERROR CORRECTION FOR LTE UPLINK COMP

(71) Applicant: NOKIA SIEMENS NETWORKS OY, Espoo (FI)

(72) Inventors: Xiaoyong Yu, Grayslake, IL (US); Shirish Nagaraj, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 194 days.

(21) Appl. No.: 14/430,699

(22) PCT Filed: Sep. 24, 2012

(86) PCT No.: PCT/US2012/056842
§ 371 (c)(1),
(2) Date: Mar. 24, 2015

(87) PCT Pub. No.: WO2014/046684
PCT Pub. Date: Mar. 27, 2014

(65) Prior Publication Data
US 2015/0282171 A1 Oct. 1, 2015

(51) Int. Cl.
*H04W 72/04* (2009.01)
*H04B 7/08* (2006.01)
(Continued)

(52) U.S. Cl.
CPC ...... *H04W 72/0453* (2013.01); *H04B 7/0857* (2013.01); *H04L 5/0005* (2013.01);
(Continued)

(58) Field of Classification Search
None
See application file for complete search history.

(56) References Cited

U.S. PATENT DOCUMENTS

| 6,275,543 B1 * | 8/2001 | Petrus | H04B 7/0851 |
| | | | 343/893 |
| 6,757,344 B2 * | 6/2004 | Carleton | H04L 27/2657 |
| | | | 370/208 |

(Continued)

FOREIGN PATENT DOCUMENTS

| WO | WO 98/27671 | 6/1998 |
| WO | WO 03/058904 A1 | 7/2003 |

OTHER PUBLICATIONS

Sesia, Stefania, et al., "LTE—The UMTS Long tern Evolution, From Theory to Practice", © 2011 John Wiley & Sons Ltd., 209 pgs.
(Continued)

*Primary Examiner* — Hassan Kizou
*Assistant Examiner* — Hashim Bhatti
(74) *Attorney, Agent, or Firm* — Harrington & Smith

(57) ABSTRACT

A method includes, for a selected user equipment for signals corresponding in part to the selected user equipment and received by antennas from a number of cells, wherein each cell has one or more antennas, and wherein each signal is from an individual one of the antennas, performing the following: estimating carrier frequency offset for each cell using one or more of the signals from the cell; performing frequency offset correction on each signal from each cell by using at least the estimated carrier frequency offset for an associated cell; estimating a channel for each frequency offset corrected signal; and combining, using the estimated channels, each of the frequency offset corrected signals to generate one or more estimates of one or more symbols transmitted from the selected user equipment. A second frequency offset correction may be performed subsequent to the combining. Apparatus, computer programs, and software are also disclosed.

20 Claims, 15 Drawing Sheets

(51) Int. Cl.
*H04L 25/02* (2006.01)
*H04L 27/00* (2006.01)
*H04L 27/26* (2006.01)
*H04L 25/03* (2006.01)
*H04L 5/00* (2006.01)

(52) U.S. Cl.
CPC ........ *H04L 25/022* (2013.01); *H04L 25/0204* (2013.01); *H04L 25/0206* (2013.01); *H04L 25/0212* (2013.01); *H04L 25/0224* (2013.01); *H04L 25/03159* (2013.01); *H04L 27/0014* (2013.01); *H04L 27/266* (2013.01); *H04L 27/2657* (2013.01); *H04L 5/0035* (2013.01); *H04L 2027/0067* (2013.01)

(56) References Cited

U.S. PATENT DOCUMENTS

| | | | | |
|---|---|---|---|---|
| 8,687,722 B2* | 4/2014 | Suzuki | ............... | H04L 5/005 341/180 |
| 2008/0056116 A1* | 3/2008 | Ge | ............... | H04L 27/2657 370/203 |
| 2010/0091920 A1* | 4/2010 | Alexander | ............ | H04L 1/0045 375/350 |
| 2012/0087263 A1* | 4/2012 | Li | ............... | H04L 27/2695 370/252 |

OTHER PUBLICATIONS

Love, Robert, et al., "Uplink Physical Layer Design", © 2011 John Wiley & Sons Ltd., 16 pgs.
Cheon, Hyunsoo, "Frequency Offset Estimation for High Speed Users in E-UTRA Uplink", © 2007 IEEE, 5pgs.
Tahat, Ashraf A., "Multi-User Channel Estimation in a 4G OFDM System", © 2007 IEEE, 5 pgs.
Ohwatari, Yusuke, et al., "Performance of Advanced Receiver Employing Interference Rejection Combining to Suppress Inter-cell Interference in LTE-Advanced Downlink", © 2011 IEEE, 7 pgs.

* cited by examiner

US 9,629,158 B2

FREQUENCY ERROR CORRECTION FOR LTE UPLINK COMP

TECHNICAL FIELD

This invention relates generally to wireless transmissions and, more specifically, relates to multiple antenna usage in wireless transmissions.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

LTE uses SC-FDMA in the uplink from mobile devices (referred to as user equipment, UEs) to base stations (an example of which is an enhanced Node B, eNB). For more detail regarding UL design in LTE, see "LTE—The UMTS Long Term Evolution: From Theory to Practice", Sesia et al., editors, Chapter 15, "Uplink Physical Layer Design", R. Love and V. Nangia, pages 346-358 (2009).

LTE also provides the opportunity to use multiple antennas, e.g., to increase data rate. Originally, such multiple antenna systems were used by individual base stations and UEs to provide improved throughput. Recently, coordinated multipoint (CoMP) systems have begun to use antennas from multiple cells (created by, e.g., remote radio frequency heads), e.g., to receive information in UL from single or multiple UEs. The information from the multiple cells is combined using algorithms such as interference rejection combining (IRC) or maximum ratio combining (MRC) to create an output for each UE. These techniques provide multiple benefits, including increased data rates. However, these techniques could be further improved.

SUMMARY

This section contains examples of possible implementations and is not meant to be limiting.

An exemplary embodiment is a method comprising for a selected user equipment for signals corresponding at least in part to the selected user equipment and received by antennas from a plurality of cells, wherein each cell has one or more antennas, and wherein each signal is from an individual one of the antennas, performing the following: estimating carrier frequency offset for each cell using one or more of the signals from the cell; performing frequency offset correction on each signal from each cell by using at least the estimated carrier frequency offset for an associated cell; estimating a channel for each frequency offset corrected signal; and combining, using the estimated channels, each of the frequency offset corrected signals to generate one or more estimates of one or more symbols transmitted from the selected user equipment.

An additional exemplary embodiment is a computer program product comprising program code for executing the method of the previous paragraph. The computer program according to this paragraph, wherein the computer program is a computer program product comprising a computer-readable medium bearing computer program code embodied therein for use with a computer.

A further exemplary embodiment is an apparatus, comprising: for a selected user equipment for signals corresponding at least in part to the selected user equipment and received by antennas from a plurality of cells, wherein each cell has one or more antennas, and wherein each signal is from an individual one of the antennas, means comprising: means for estimating carrier frequency offset for each cell using one or more of the signals from the cell; means for performing frequency offset correction on each signal from each cell by using at least the estimated carrier frequency offset for an associated cell; means for estimating a channel for each frequency offset corrected signal; and means for combining, using the estimated channels, each of the frequency offset corrected signals to generate one or more estimates of one or more symbols transmitted from the selected user equipment.

In a further exemplary embodiment, a communication system comprises the apparatus in accordance with the previous paragraph.

In an additional exemplary embodiment, an apparatus comprises one or more processors and one or more memories including computer program code. The one or more memories and the computer program code configured, with the one or more processors, to cause the apparatus to perform at least the following: for a selected user equipment for signals corresponding at least in part to the selected user equipment and received by antennas from a plurality of cells, wherein each cell has one or more antennas, and wherein each signal is from an individual one of the antennas, performing the following: estimating carrier frequency offset for each cell using one or more of the signals from the cell; performing frequency offset correction on each signal from each cell by using at least the estimated carrier frequency offset for an associated cell; estimating a channel for each frequency offset corrected signal; and combining, using the estimated channels, each of the frequency offset corrected signals to generate one or more estimates of one or more symbols transmitted from the selected user equipment.

DETAILED DESCRIPTION OF THE DRAWINGS

Figure 1:
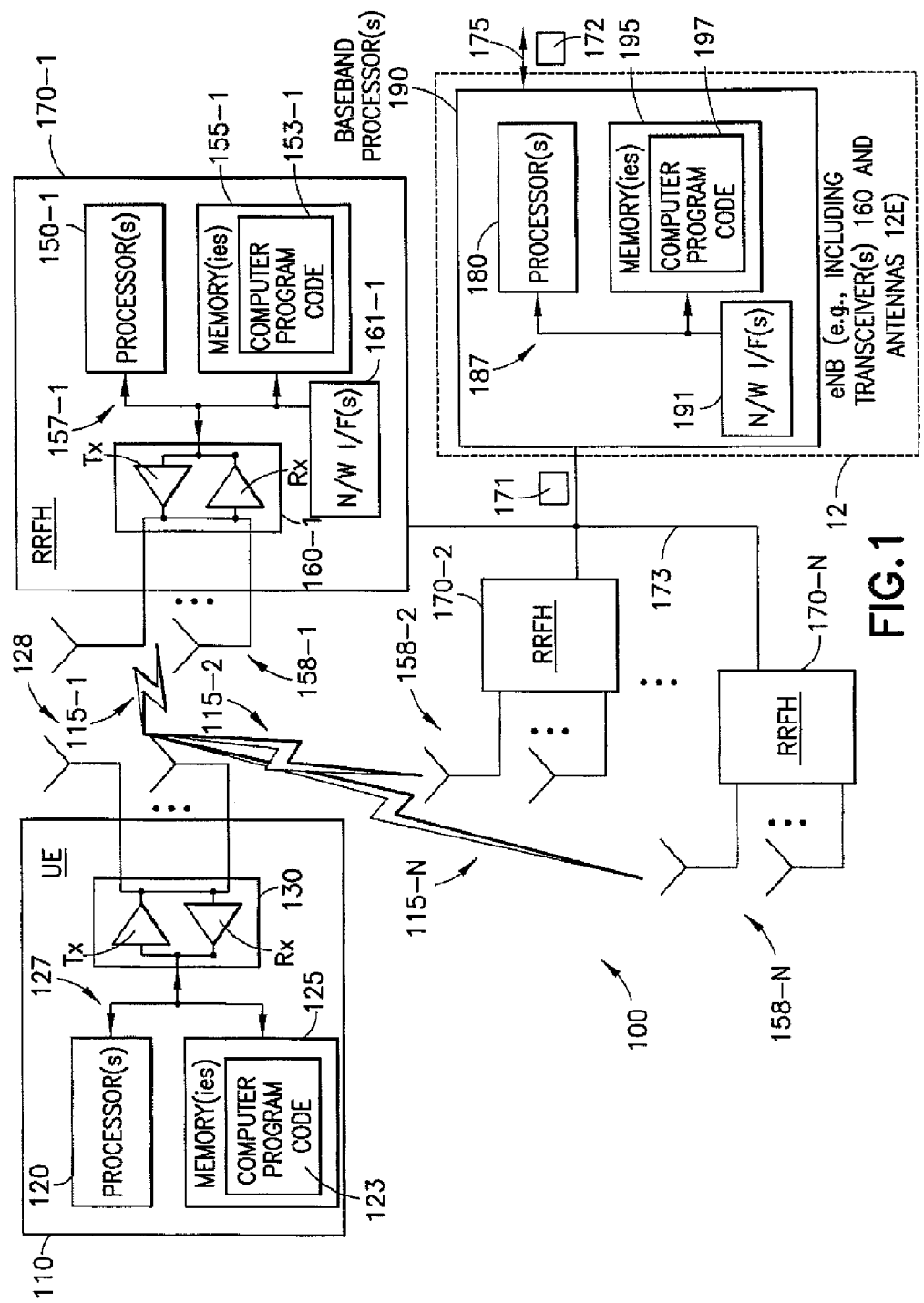
FIG. 1 illustrates an exemplary system in which the exemplary embodiments of the instant invention may be practiced.

Before proceeding with additional description of problems, reference is made to FIG. 1, which illustrates an exemplary system in which the exemplary embodiments of the instant invention may be practiced. In FIG. 1, a user equipment (UE) 110 is in wireless communication with a wireless network 100 via an associated link 115-1 to 115-N with each remote RF head (RRFH) 170-1 to 170-N. The user equipment 110 includes one or more processors 120, one or more memories 125, and one or more transceivers 130 interconnected through one or more buses 127. Each of the one or more transceivers 130 includes a receiver (Rx) and a transmitter (Tx). The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The wireless network 100 includes N remote RF heads (RRFHs) 170, of which 170-1, 170-2, and 170-N are shown, and one or more baseband processors 190. The internal elements of RRFH 170-1 will be described herein, and it is assumed the RRFH 170-2 and 170-N are similar. The RRFH 170-1 includes one or more processors 150-1, one or more memories 155-1, one or more network interfaces (N/W I/F(s)) 161-1, and one or more transceivers 160-1 interconnected through one or more buses 157-1. Each transceiver 160-1 includes a receiver, Rx, and a transmitter, Tx. The one or more transceivers 160-1 are connected to one or more antennas 158-1. The one or more memories 155-1 include computer program code 153-1. The one or more memories 155-1 and the computer program code 153-1 are configured to, with the one or more processors 150-1, cause the RRFH 170-1 to perform one or more of the operations as described herein. The one or more network interfaces 161-1 communicate over networks such as the network 173.

The one or more baseband processors 190 include one or more processors 180, one or more memories 195, and one or more network interfaces (N/W I/F(s)) 191 interconnected through one or more buses 187. The one or more memories 195 include computer program code 197. The one or more memories 195 and the computer program code 197 are configured to, with the one or more processors 180, cause the one or more baseband processors 190 to perform one or more of the operations as described herein. The one or more network interfaces 191 communicate over networks such as the networks 173, 175.

In this example, the RRFHs 170 accept baseband information 171 via network 173, convert the baseband information 171 to RF signals, and transmit the RF signals via the Tx and the antennas 158 over the link 115 to the UE 110. The RRFHs 170 receive RF signals over the link 115 from the UE 110 and convert the RF signals to baseband information 171, which the RRFHs 170 communicate to the one or more baseband processors 190 using the network 173. The examples herein concern uplink from the UE 110 to the RRFHs 170 and subsequently to the baseband processor(s) 190. The baseband processor(s) 190 perform processing of the baseband information 171 and output received information 172 from the UE 110 over the network 175. The baseband processor(s) 190 may be located in a number of locations, of which one possibility is illustrated in FIG. 1, where the baseband processor(s) 190 are part of an eNB 12. The eNB 12 may include one or more transceivers 160 and one more antennas 12E. In another example, the baseband processor(s) 190 may be part of another node, such as controller node that controls multiple RRFHs 170.

The computer readable memories 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150 and 180 may be of any type suitable to the local technical environment, and may include one or more of general purpose computers, special purpose computers, microprocessors, digital signal processors (DSPs), application-specific integrated circuits (ASICs), other integrated circuits (ICs), and processors based on a multi-core processor architecture, as non-limiting examples.

Figure 2:
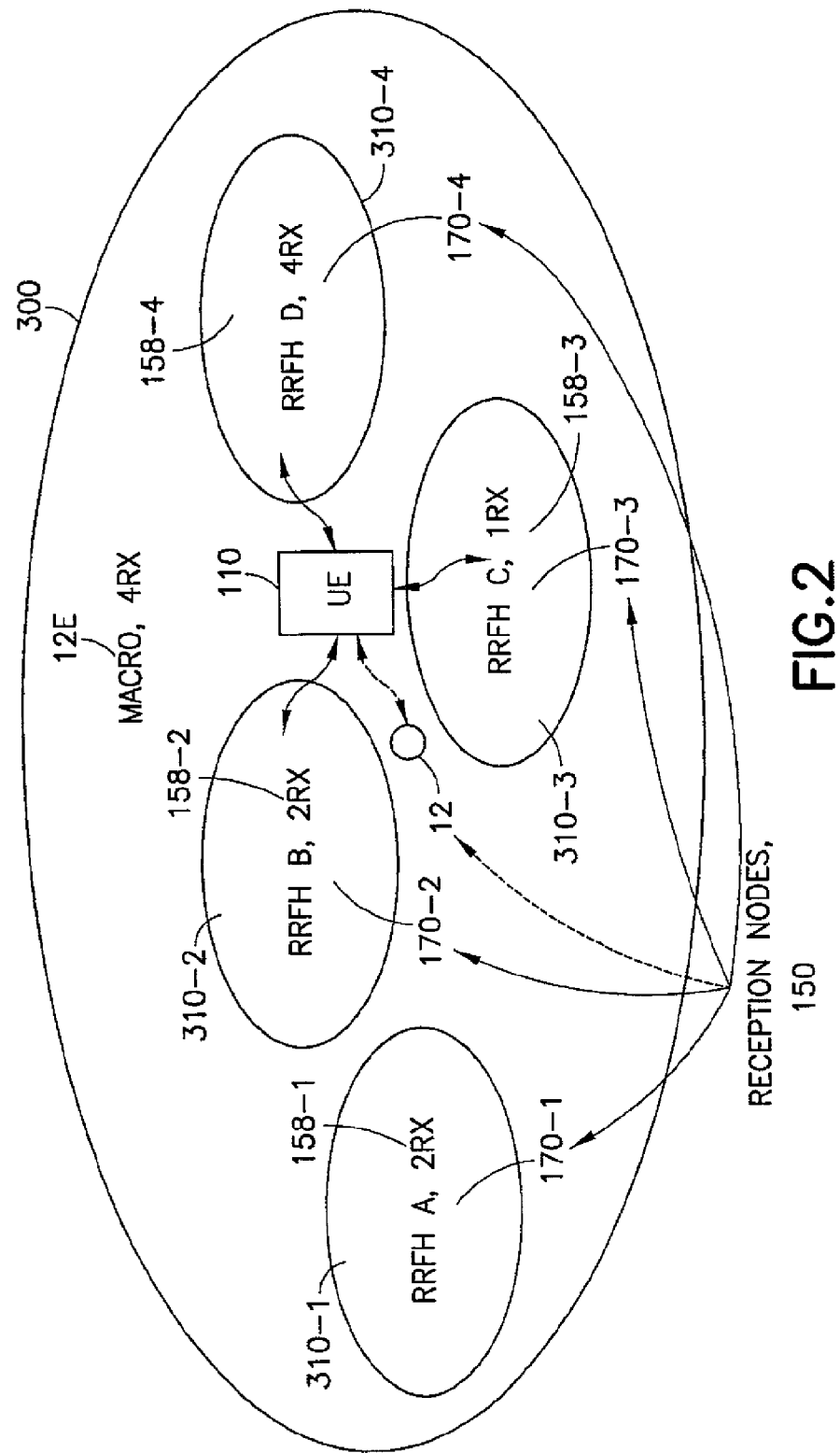
FIG. 2 is an example of a macro cell having multiple RRFHs within a macro cell.

One example of a CoMP deployment scenario of interest is depicted in FIG. 2. Within the coverage area 300 of one macro eNodeB 12 with, e.g., 4 (four) RX antennas 12E, there are altogether four hotspots 310-1 through 310-4 covered by four reception nodes 150 (e.g., RRFHs 170-1 through 170-4), each having some reception antennas 158-1 through 158-4, respectively. In the example of FIG. 2, the UE 110 can transmit to the RRFHs 170-2, 170-3, and 170-4 and potentially the eNB 12. In this example, reception nodes 150 therefore include RRFHs 170-2, 170-3, and 170-4, and the eNB 12 receives baseband information 171 from the RRFHs 170-2, 170-3, and 170-4 and processes the baseband information 171 in the exemplary manners described below. In another example, the eNB 12 may have a receiver (e.g., as part of a transceiver 160) and a number of antennas 12E, and therefore the eNB 12 may form a reception node 150.

Figure 3:
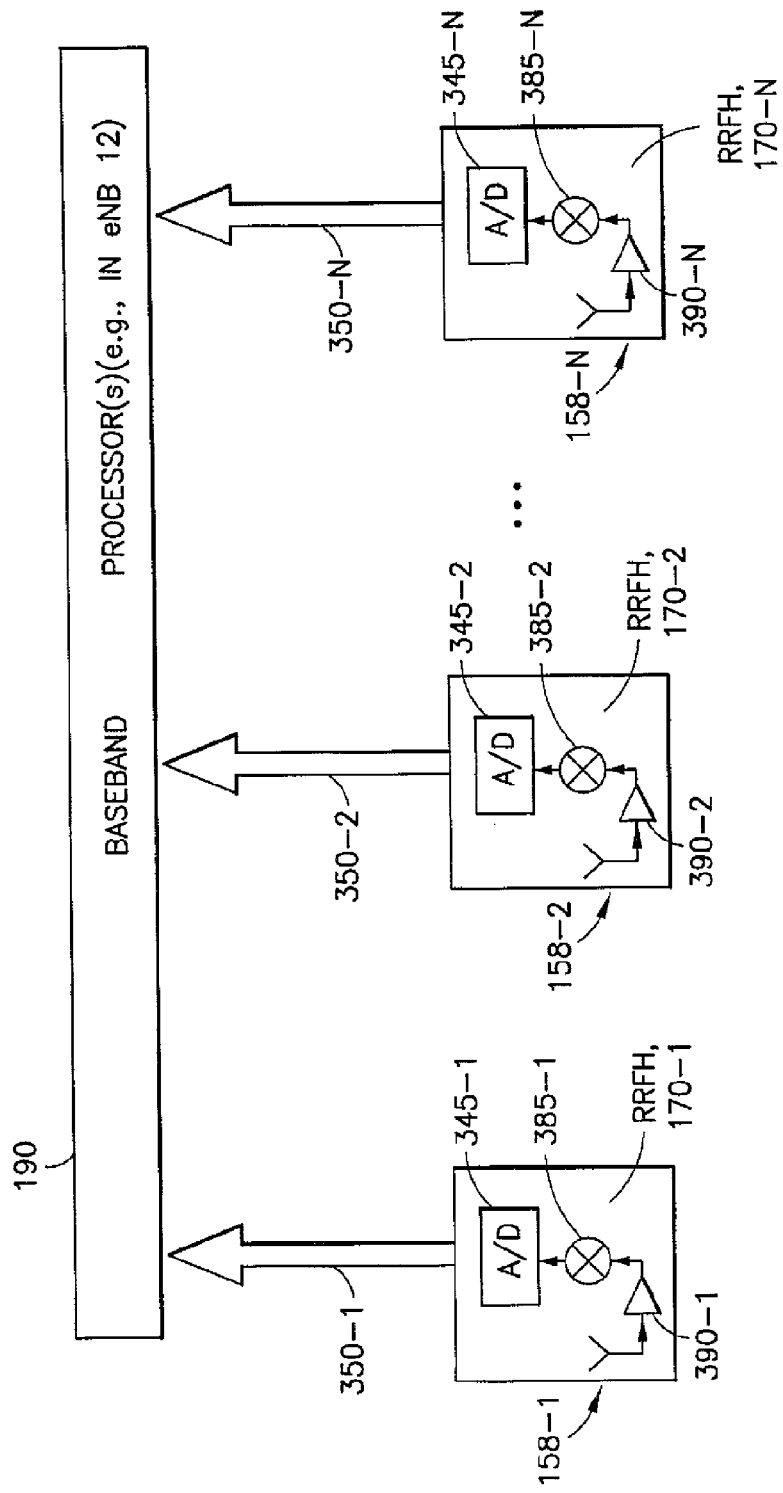
FIG. 3 is a block diagram of a portion of a multipoint reception system with multiple reception nodes, in a general example to illustrate possible techniques for performing reception.

FIG. 3 is a block diagram of a portion of a multipoint reception system with multiple reception nodes 150, in a general example to illustrate possible techniques for performing reception. In this example, the reception nodes are all RRFHs 170-1 through 170-N and are coupled to the baseband processor(s) 190. Each RRFH 170 in this example includes an analog to digital (A/D) converter 345, antenna(s) 158, a power amplifier 390, and a down converter 385. This is merely exemplary and the RRFHs may have other configurations. For instance, the down converters 385 could come after the A/D converters 345 in the signal path (i.e., instead of before the A/D converters 345 as shown in FIG. 3). Each of the RRFHs 170 communicate digital time-domain signals 350 (i.e., 350-1 through 350-N) to the baseband processor(s) 190. It is noted that FIG. 3 only shows a portion of the receiver, Rx, of the transceiver 160 of the RRFH 170.

Now that the exemplary system has been described, it is beneficial to return to the use of CoMP in uplink. For ease of reference, the rest of this disclosure is divided into sections.

1. Introduction to Problems with Phase Error for Uplink CoMP

Phase error is an inevitable problem for wireless communication systems in reality. Such phase error is manifested as carrier FO (Frequency Offset) and PN (Phase Noise) or phase jittering. It is well known that the impact of the carrier frequency offset and phase noise on OFDM (Orthogonal Frequency-Division Multiplexing) and SC-FDMA (Single Carrier—Frequency Division Multiple Access) signals is ICI (Inter-Carrier Interference) and received data symbol phase rotation. While there is not an easy way to remove ICI in practice, the received data symbol phase error can be simply corrected by phase de-rotation, once the associated FO is known, by FOE (Frequency Offset Estimation). This implies any practical OFDM or SC-FDMA receiver is left with ICI and data symbol phase jittering resulting from phase noise. Fortunately, ICI is negligible for carrier FO less than 1% (one percent) of subcarrier spacing and tolerable if FO is less than 2% (two percent) of subcarrier spacing. Both ICI and data symbol phase jittering caused by phase noise of any OFDM or SC-FDMA transmitter and receiver with LO (Local Oscillator) using a PLL (Phase Lock Loop) are negligible. Therefore, FOC (Frequency Offset Compensation) in most practical OFDM or SC-FDMA receivers means data symbol phase error correction.

As stated above, a SC-FDMA technique has been used in 3GPP (third Generation Partnership Project) LTE (Long Term Evolution) uplink communication, which has a similar system throughput and essentially the same overall complexity as OFDMA (a variation of OFDM) while having a lower transmit PAPR (Peak to Average Power Ratio). Since two DFT (Digital Fourier Transform) and IDFT (Inverse Digital Fourier Transform) pairs are implemented in SC-FDMA transmitter and receiver, the impact of carrier FO and phase noise on LTE uplink is similar to that of OFDM. In other words, most LTE uplink receivers are left with phase jittering and ICI and only perform FOC associated with carrier FO. Downlink and uplink CoMP are advanced features of LTE, where multiple cells cooperatively serve a group of UE (User Equipment) and effectively form a "network MIMO" (Multiple-Input and Multiple-Output). From a synchronization perspective, some special questions have been raised for CoMP technology. These questions have been extensively investigated and well-understood for a traditional single cell transmitter and receiver. In LTE uplink CoMP, a number of non-co-located cells are expected to coordinately perform baseband signal processing for a particular UE. Due to physical distances among CoMP cells, or associated antennas, carrier FO seen by each cell will be different even for the same UE. These FOs are caused by many factors, such as LO mismatching between the UE and each cell, traditional Doppler effects resulting from the UE moving and "artificial Doppler" effects due to effective different distances of the UE to each CoMP cell. In addition, aggregated phase noise power seen by a central baseband receiver is expected to be higher, which is in a range of a couple of dB depending on how many cells are used for uplink CoMP. In general, CoMP technology is used in an area with a high density of UEs to provide better coverage. This means strong interference and challenges many receiver design techniques. Per current topic, a better FOE and FOC solution needs to be derived particularly for the uplink CoMP. In what follows, each issue above will be individually investigated.

2. Impact of Phase Noise on LTE Uplink CoMP

The time-domain signal model for phase error investigation can be expressed as $$y(t) = x(t)e^{j\theta(t)},$$

where t represents sampling time; x(t) and y(t) are transmitted and received samples at time instant t respectively; and $\theta(t)$ denotes a time varying phase caused by a carrier FO between the receiver and transmitter as well as the PN due to imperfect sine generation. The phase error resulting from carrier FO corresponds to continuous phase shift portion of $\theta(t)$ over time that can be written as $2\pi\Delta f t + \theta_0$, where $\Delta f$ is FO and $\theta_0$ is any initial phase. For pure PN, or phase jittering modeling, $\Delta f$ can be set to 0 (zero) and $\theta(t)$ may be modeled as a Wiener process for which $E[\theta(t+t_0)-\theta(t_0)]^2 = 4\pi\beta|t|$ and $E[\theta(t)] = 0$, where $\beta$ denotes the one-sided 3 dB linewidth of the Lorentzian PDS (Power Density Spectrum) of the free-running carrier generator. This single-sided phase noise PDS of free-running LO is given as the following:

$$L_\theta(f) = \frac{2}{\pi\beta(1 + f^2/\beta^2)}.$$

For a real tuner with PLL, the double sided PDS (which is mirrored version of the single sided PDS around the carrier frequency) of $\theta(t)$ can be expressed as the following:

$$L_\theta(f) = 10^{-c} + \begin{cases} 10^{-a} & |f| \leq f_1 \\ 10^{-(f-f_1)\frac{b}{f_2-f_1} - a} & f_1 < f \\ 10^{(f+f_1)\frac{b}{f_2-f_1} - a} & f < -f_1. \end{cases}$$

The parameter c determines the noise floor; parameters a and $f_1$ represent characteristics of the PLL; b and $f_2$ indicate the steepness of a linear slope of the PDS and where the noise floor becomes dominant, respectively. For example, c=10.5, b=4, a=6.5, $f_1$=1000 Hz and $f_2$=10000 Hz represent a PDS having noise floor at −105 dB, linear slope of 40 dB/decade, and the like.

Figure 4:
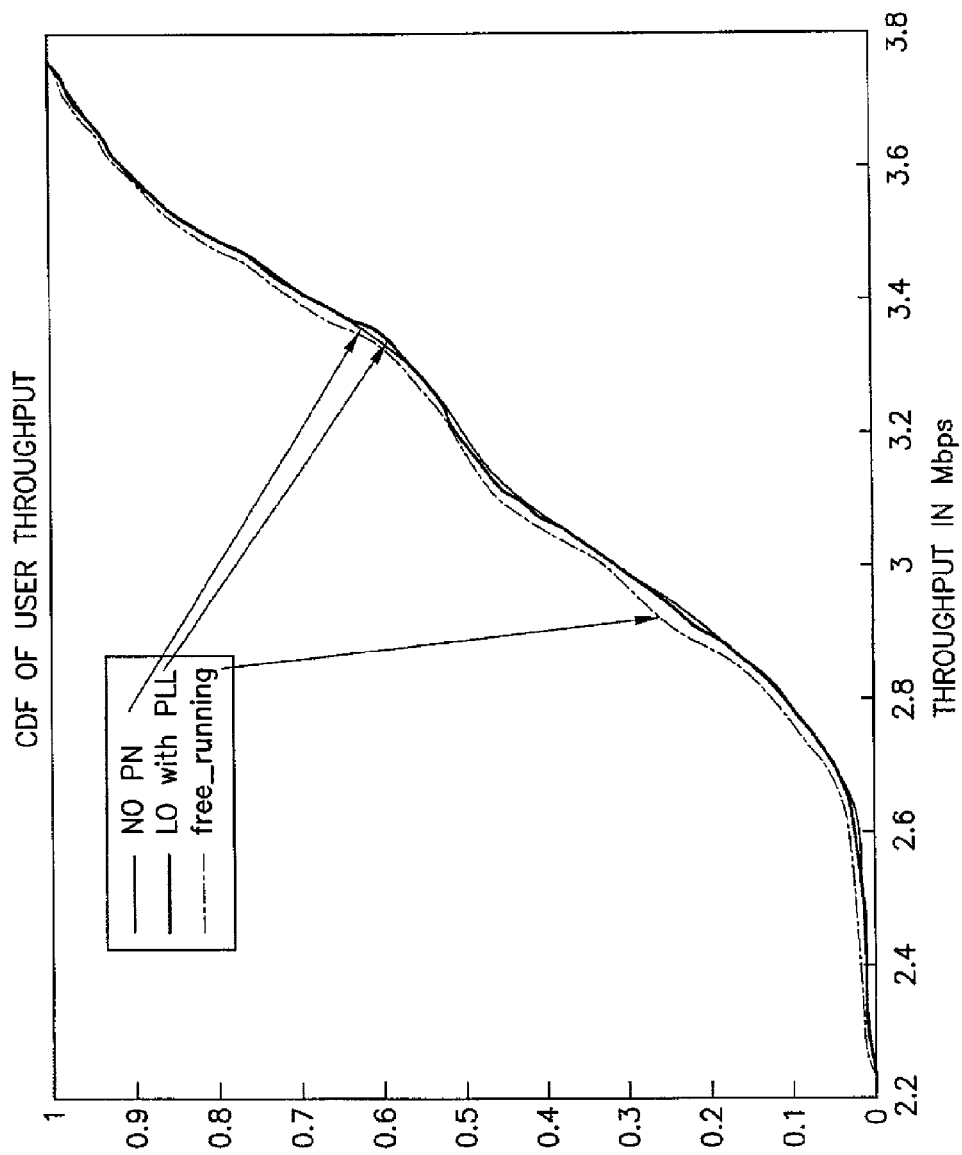
FIG. 4 is a graph illustrating CDF of average UE throughput in the presence of PN in 4-cell CoMP.

To evaluate the phase error impact on performance of LTE uplink with CoMP, an MCLS (Multi-Cell Link Simulator) has been developed and used for simulation. In addition to all traditional link level simulation functions, the MCLS has many functions of system level simulator, such as UE and cell drop, scheduler and power control, and the like. A list of cells for uplink CoMP is generated for each UE by using PL (Path Loss) of each drop. In addition to traditional link level simulation results, like FER (Frame Error Rate) and BER (Bit Error Rate), many statistics per system performance, such as average UE throughput, cell-edge UE throughput, system throughput, UE spectral efficiency, system spectral efficiency and so on, can be generated and collected during an MCLS simulation. For phase noise impact investigation, three cases were simulated corresponding to an ideal case (no PN), PN of LO with PLL and free-running respectively. In a simulation, every cell had two receive antennas, each antenna had PN injected except for an ideal case. FIG. 4 shows a CDF (Cumulative Distribution Function) of average UE throughput (in Mbps) of a system with 4-cell uplink CoMP for the above-mentioned three cases. It can be seen that the impact of PN generated based on a LO with PLL, which is most likely in reality, on uplink CoMP is negligible since the lines for no PN and for LO with PLL are almost on top of each other. While the degradation of PN with free-running is noticeable, this degradation is tolerable in practice. Thus, it can be said that PN is not a practical issue for LTE uplink with CoMP.

3. FOE and FOC for LTE Uplink

To understand LTE uplink FOE and FOC, the impact of FO will first be analyzed. Assuming the LTE uplink signal has a carrier FO $\Delta f$ in Hz, one can write the received signal of pth SC-FDMA symbol as the following:

$$r_n(p) = x_n(p)e^{j2\pi \times \Delta f \times T_s \times [n+(p-1)N+pN_{CP}]} = x_n(p)e^{j\Phi(p)}e^{j\frac{2\pi}{N}\Delta f_{norm} n},$$

where $n=0, 1, 2, \ldots, (N+N_{CP}-1)$; N is system FFT size and $T_s$ is sample interval; $N_{CP}$ is number of samples of CP (Cyclic Prefix) in a SC-FDMA symbol; $\Delta f_{norm} = \Delta f/15000$ is subcarrier spacing normalized FO and $\Phi(p) = 2\pi \Delta f T_s[(p-1)N+pN_{CP}]$.

An FFT of a portion of N continuous time-domain samples associated with a pth SC-FDMA symbol provides a frequency-domain signal. The kth subcarrier of this SC-FDMA symbol can be expressed as the following:

$$DFT(y(p))|_k = \frac{1}{\sqrt{N}}\sum_{n=0}^{N-1} r_n(p)e^{-j\frac{2\pi}{N}kn}$$

$$= e^{j\Phi(p)}\frac{1}{\sqrt{N}}\sum_{n=0}^{N-1} x_n(p)e^{j\frac{2\pi}{N}\Delta f_{norm} n}e^{-j\frac{2\pi}{N}kn}$$

$$= e^{j\Phi(p)}X(p)_{k-\Delta f_{norm}},$$

where y(p) represents the portion of N-samples associated with the pth SC-FDMA symbol. From the equation above, one can see that carrier FO causes received SC-FDMA symbol common phase rotation, corresponding to $e^{j\Phi(p)}$, and a constant frequency shift represented by $\Delta f_{norm}$. According to the DFT modulation property as illustrated by the transform pair below, $$x(m)e^{j2\pi k_0 m/M} \leftrightarrow X(k-k_0).$$

After IDFT in LTE uplink receiver, this frequency shift represented by $\Delta f_{norm}$ results in a time-domain signal phase rotation that depends on time index m, that is $$x(m)e^{j\Psi(m)},$$

where M is the size of the IDFT and $\Psi(m) = 2\pi\Delta f_{norm}$ m/M. It should be noted that an OFDM or SC-FDMA signal has a rectangular time-domain pulse shaping that translates to a frequency-domain sinc function. Samples of the sinc function are interference free if sampling instant is perfect. In other words, if the sampling instant is the center of each subcarrier, there is no interference or ICI. Clearly, the frequency shift of $X(p)_{k-\Delta f_{norm}}$ implies imperfect sampling instants of the sinc function and the imperfect sampling results in ICI. This FO induced ICI cannot be easily removed. Most practical LTE uplink receivers are left with this ICI and only correct phase error by de-rotation based on $e^{j\Phi(p)}$ and $e^{j\Psi(m)}$ to mitigate impact of carrier FO.

Figure 5:
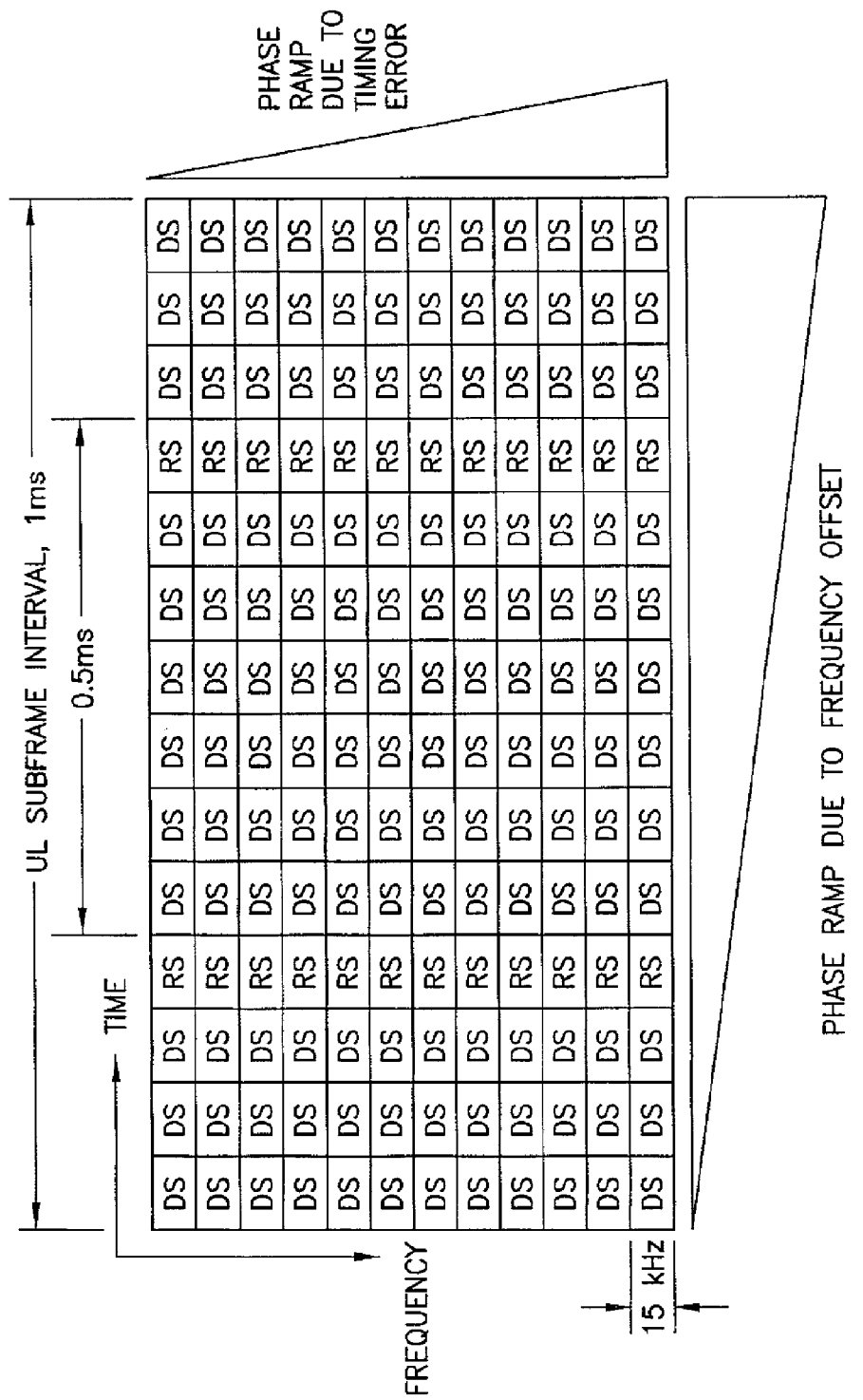
FIG. 5 is an illustration of phase ramp errors for an LTE uplink PRB structure.

An LTE uplink PRB (Physical Resource Block) pair is depicted in FIG. 5, where each subframe has 2 PRBs, each of which includes 7 SC-FDMA symbols (0.5 ms) with a DMRS (De-modulation Reference Signal or RS for short) in the middle. DS in the figure stands for data symbol. Each PRB has 12 subcarriers in the frequency dimension. It is also shown that any timing offset and frequency offset cause phase ramp in frequency dimension and time dimension respectively. Therefore, FOE can be calculated based on the phase difference of the two RS, i.e. $\Phi(4)-\Phi(11)$. More specifically, FOE is given as the following:

$$\Delta f = -\frac{1}{0.001\pi}\angle\left(\frac{1}{M}\sum_{k=0}^{M-1}P_k(4)P_k^*(11)\right),$$

where $\angle x$ denotes angle of x; $P_k(n)$ is demodulated kth subcarrier of nth RS and ( )* represents conjugate. Due to phase ambiguity, the FOE calculated above is limited in the range of ±1000 Hz. To extend FOE range, other methods can be used.

Figure 6:
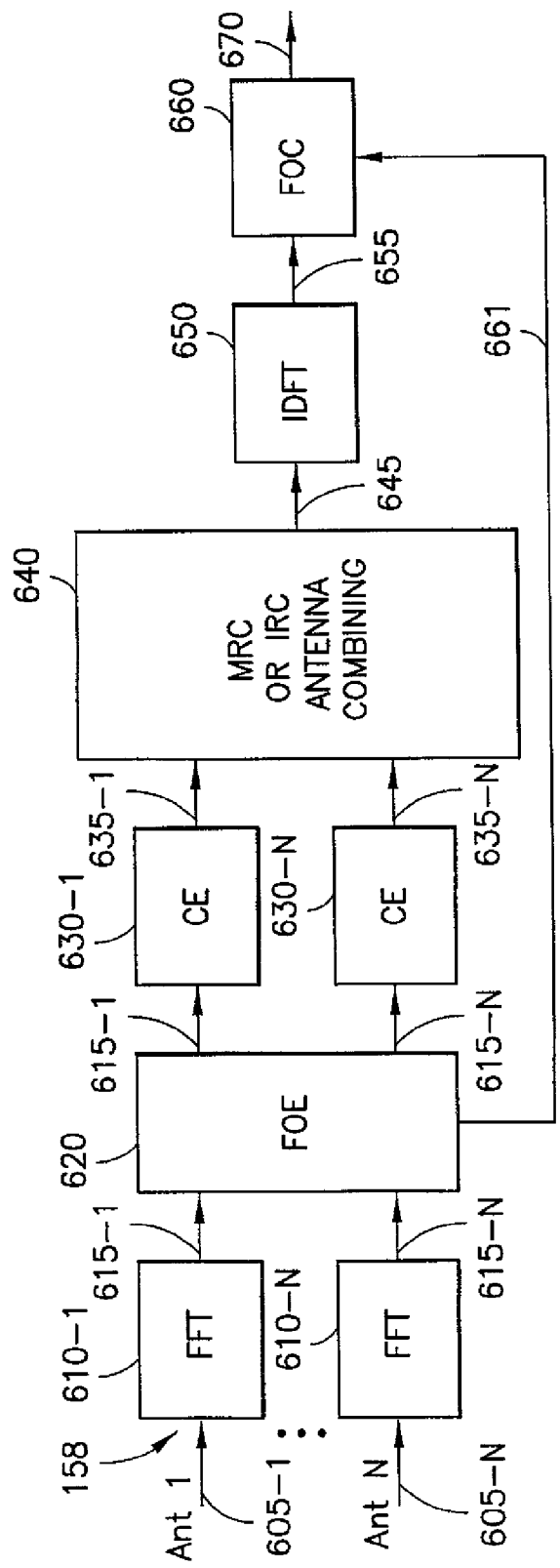
FIG. 6 is a block diagram that illustrates operations for conventional frequency offset correction for collocated antennas.
Figure 7:
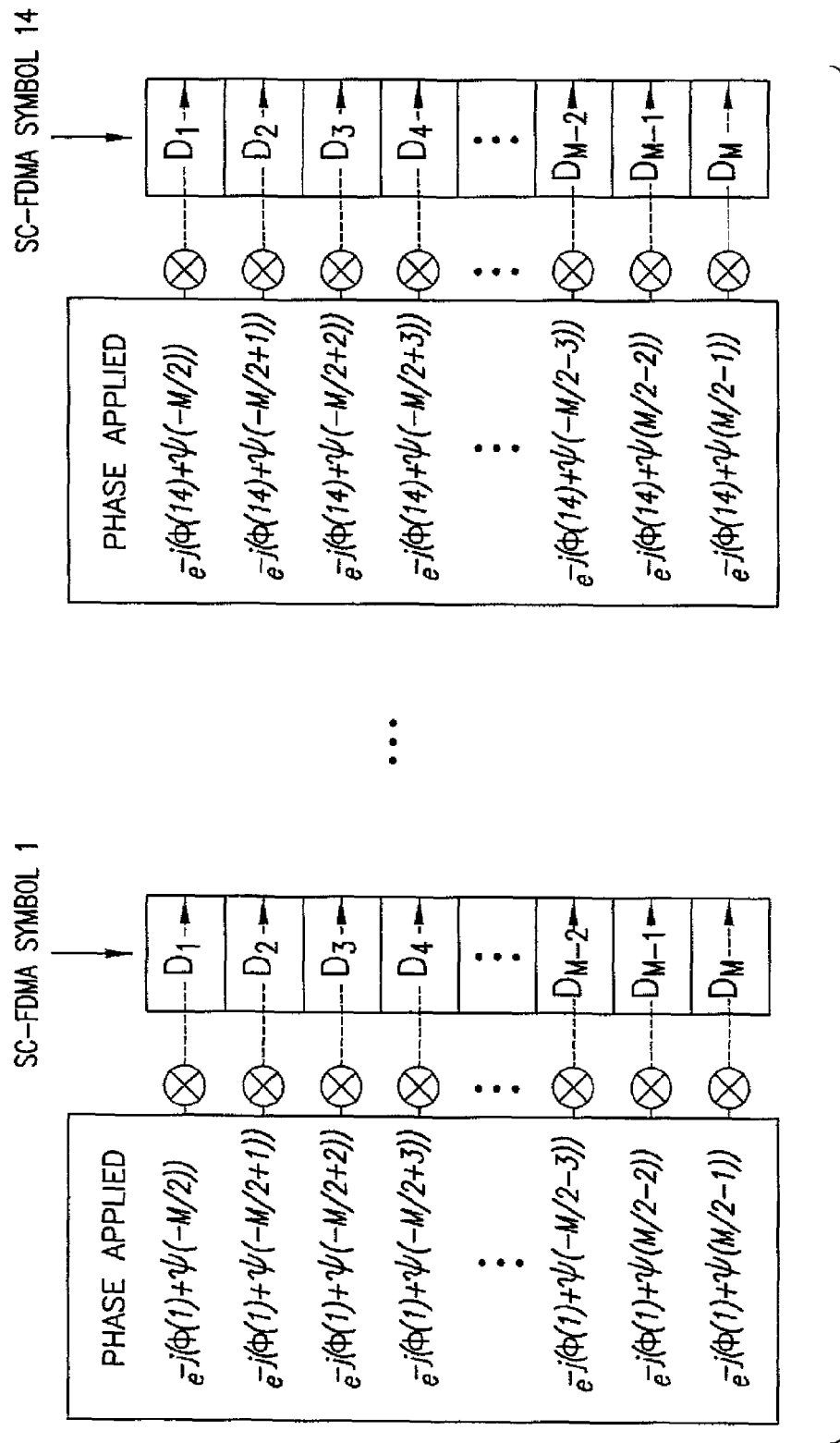
FIG. 7 is a block diagram illustrating conventional FOC, where composite phase rotation is applied to each data symbol after an IDFT.

In case of multiple receive antennas, $\Delta f$ is firstly calculated (see FOE 620 in FIG. 6) on frequency-domain signals 615 (see FIG. 6) from each antenna and a final FOE is obtained by averaging all such $\Delta f$. The FFTs 610-1 through 610-N convert the digital time-domain signals 605 to frequency-domain signals 615. Once the final FOE is available, FOC is achieved by phase rotation based on $e^{j\Phi(p)}$ and $e^{j\Psi(m)}$ after antenna combining 640 (e.g., possibly including frequency-domain equalization) and IDFT 650, as shown in FIG. 6, where CE, IRC and MRC are channel estimate, interference reduced combining and maximum ratio combining respectively. Exemplary CE techniques include but are not limited to the techniques presented in Ashraf Tahat, "Multi-User Channel Estimation in a 4G OFDM System", The 18th Annual IEEE International Symposium on Personal, Indoor and Mobile Radio Communications (PIMRC'07) (2007). Exemplary IRC techniques that may be used are presented in but are not limited to Y. Ohwatan et al., "Performance of Advanced Receiver Employing Interference Rejection Combining to Suppress Inter-cell Interference in LTE-Advanced Downlink", Vehicular Technology Conference (VTC Fall) (2011). The FOE 620, CE 630, the antenna combining 640, the IDFT 650, and the FOC 660 are performed per UE (and thus would be performed multiple times for multiple UEs). FIG. 6 is a block diagram of an exemplary logic flow diagram that illustrates the operations for conventional frequency offset correction for collocated antennas. More specifically, $\Phi(p)=2\pi\Delta f T_s[(p-1)N+pN_{CP}^{(p)}]$ is first calculated with p=1, 2, ..., 14 for all 14 SC-FDMA symbols in a subframe, then $e^{-j\Phi(4)}$ and $e^{-j\Phi(11)}$ are applied to the $1^{st}$ and $2^{nd}$ DMRS respectively (e.g., to ensure the subsequent CE is FO "free"), which is followed by CE on a signal 615 from each antenna (By CE 630-1 to 630-N) and IRC or MRC antenna combining 640, which creates frequency-domain estimates (in signal 645) of data symbols received from a UE. Each CE 630 creates a signal 635, which includes the signal 615 and additional CE information. Consequently, output 645 of the antenna combining 640 is converted back to the time-domain by the IDFT 650 (creating time-domain estimates in signal 655 of data symbols received from a UE) that is followed by phase de-rotation (FOC 660) on all data symbols based on the M×12 matrix in the following:

$$\begin{bmatrix} e^{-j(\Phi(1)+\Psi(-M/2))} & e^{-j(\Phi(2)+\Psi(-M/2))} & \ldots & e^{-j(\Phi(14)+\Psi(-M/2))} \\ e^{-j(\Phi(1)+\Psi(-M/2+1))} & e^{-j(\Phi(2)+\Psi(-M/2+1))} & \ldots & e^{-j(\Phi(14)+\Psi(-M/2+1))} \\ \ldots & \ldots & \ldots & \ldots \\ e^{-j(\Phi(1)+\Psi(-M/2-1))} & e^{-j(\Phi(2)+\Psi(-M/2+1))} & \ldots & e^{-j(\Phi(14)+\Psi(-M/2-1))} \end{bmatrix},$$

where $\Phi(p)=2\pi\Delta f T_s[(p-1)N+pN_{CP}^{(p)}]$ for p=1, 2, 3, 5, 6, 7, 8, 9, 10, 12, 13, 14 and $\Psi(m)=2\pi\Delta f_{norm}m/M$ for m=−M/2, −M/2+1, . . . , 0, 1, . . . , M/2−1. Reference 661 indicates that the determined $\Delta f_{norm}$ is forwarded to the FOC 660. FIG. 7 illustrates the application of the M×12 graphically. The D in FIG. 7 corresponds to the DS in FIG. 5. Please note $N_{CP}^{(p)}$ is written as a function of p to emphasize the number of CP for DMRS and data SC-FDMA symbols are different. This M×12 matrix is multiplied with all data QAM (Quadrature Amplitude Modulation) symbols in a subframe element-by-element. The output 670 is a set of time-domain received symbols corresponding to a single UE. For each UE, the process from 620 to 670 should be performed again.

4. FOE and FOC for LTE Uplink with CoMP

Figure 8:
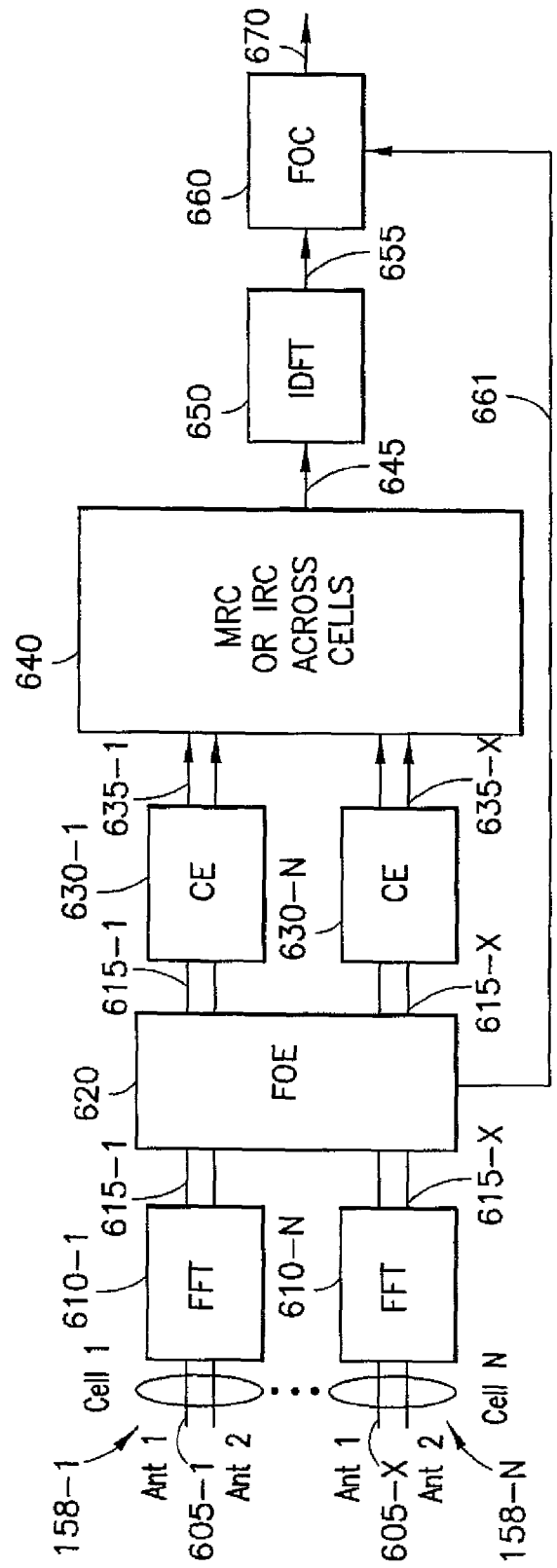
FIG. 8 is a block diagram that illustrates mathematical operations for conventional frequency offset correction.

It has been shown that FOC implemented after the IDFT of the receiver (as shown in FIGS. 6 and 7) is able to correct all phase error resulting from carrier FO in case of regular system without CoMP. From an implementation perspective, this post-IDFT FOC is a correct design that requires the lowest computational complexity as compared to other techniques. However, in case of uplink CoMP, where a number of non-collocated cells or antennas are used to receive a particular UE, this FOC does not work properly any more. FIG. 8 is a block diagram similar to the diagram in FIG. 6, divided by cells (of which there are N in this example and a total of X antennas). As mentioned before, when these CoMP cells are separated with different physical distances and with the UE moving around, the effective FO seen by each cell will be different. Obviously, the single FOE value, which is averaged over all CoMP cells, does not reflect the FO differences and the post-IDFT is no longer able to compensate associated phase errors. Therefore, there is a need to redesign a FOC structure for LTE uplink system with CoMP. Another challenge related to the uplink CoMP is FOE in the presence of strong interference.

In case of multiple UE that share the same radio resource, received DMRS can be expressed as the following:

$$Y_k = \sum_{u=1}^{U} g_k(u) S_k(u) \quad k = 0, 2, \ldots, M-1$$

where $g_k(u)$ and $S_k(u)$ are channel gain and pilot sequence of UE u on subcarrier k respectively. Associated demodulated DMRS of desired UE, say UE 1, is given as the following:

$$P_k = Y_k S_k^*(1) = g_k(1) S_k(1) S_k^*(1) + \sum_{u=2}^{U} g_k(u) S_k(u) S_k^*(1).$$

Obviously, in the presence of strong interference where $$g_k(1) \gg \sum_{u=2}^{U} g_k(u)$$

does not hold any more, the FOE calculated using the method described previously suffers dramatic performance degradation or even completely fails to work. Fortunately, the LTE DMRS is created based on well-known ZC (Zadoff-Chu) sequences with different frequency shifts. One benefit of the LTE DMRS is its orthogonality among multiple UEs using the same base ZC sequence, which means the following:

$$\frac{1}{M}\sum_{k=0}^{M-1} S_k(u) S_k^*(v) = \begin{cases} 1 & \text{if } u = v \\ 0 & \text{if } u \neq v. \end{cases}$$

Even for non coordinated DMRS, which are not orthogonal to each other, $$\frac{1}{M}\sum_{k=0}^{M-1} S_k(u) S_k^*(v) \ll 1$$

for UE u and v. Therefore, the interference among LTE DMRSs can be significantly reduced by taking the advantage of LTE DMRS characteristics. The proposed FOE for cell c in a CoMP system is consequently the following:

$$\Delta f_c = -\frac{1}{0.001\pi} \angle \left\{ \left( \frac{1}{M}\sum_{k=0}^{M-1} P_k(4) \right) \left( \frac{1}{M}\sum_{k=0}^{M-1} P_k^*(11) \right) \right\},$$

which is based on phase difference of averaged demodulated DMRS in a subframe. Comparing with FOE described in Section 3 above, one can see that traditional FOE is calculated with average phase difference of DMRS in a subframe. Thus, just a simple swap of average and phase difference will result in a large difference.

Figure 9:
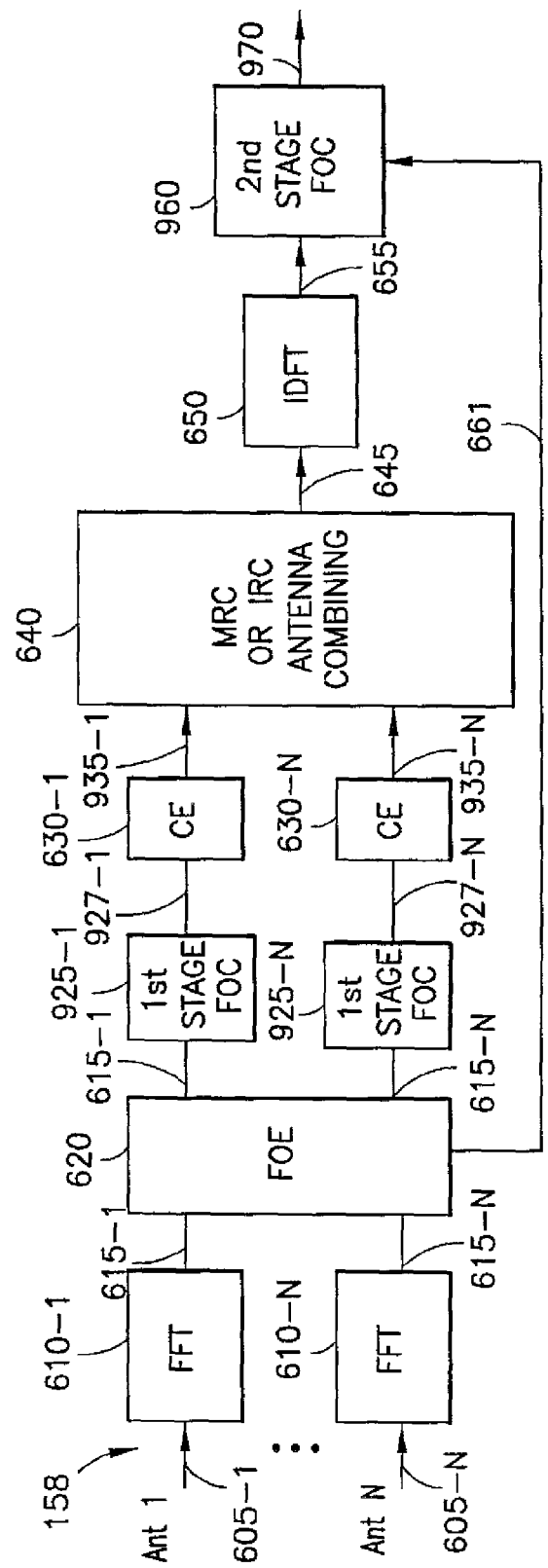
FIG. 9 is a block diagram of an exemplary logic flow diagram implemented by a baseband processor that illustrates the operations for frequency error correction for LTE uplink in a system with collocated antennas, where the operations may be considered to be an exemplary method, a result of execution of computer program instructions embodied on a computer readable memory, and/or functions performed by logic implemented in hardware, in accordance with exemplary embodiments of this invention.
Figure 10:
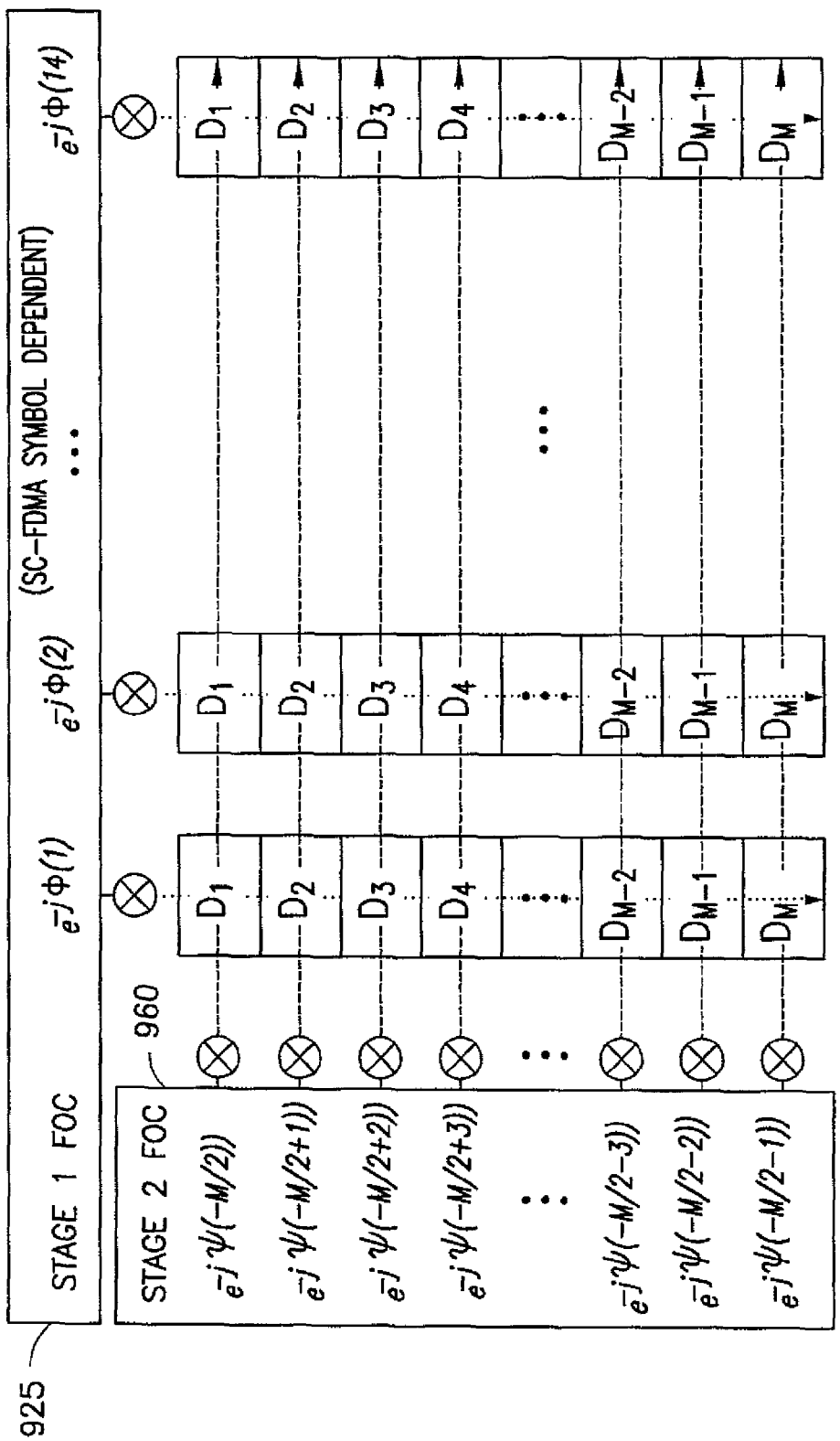
FIG. 10 is a block diagram that illustrates mathematical operations for frequency offset correction in accordance with an exemplary embodiment of the instant invention.

It is beneficial to revisit FOC in traditional LTE uplink without CoMP. Looking at the two phases $e^{j\Phi(p)}$ and $e^{j\Psi(m)}$ used to determine de-rotation on post-IDFT data QAM symbols, one can see the majority contribution is from phase $e^{j\Phi(p)}$ since $\Phi(p)=2\pi\Delta f T_s[(p-1)N+pN_{CP}^{(p)}]=2\pi\Delta f_{norm}(1+N_{CP}^{(p)}/N)$ for p>1 is usually much larger than $\Psi(m) = 2\pi\Delta f_{norm}m/M$ for m=−M/2, −M/2+1, . . . , 0, 1, . . . , M/2−1. Another observation is that $e^{j\Phi(p)}$ is common for a whole SC-FDMA symbol p and can be moved from post-IDFT to the place before CE and the antenna combining such that each $e^{j\Phi(p)}$ can be computed using the observed FO $\Delta f$ and consequently applied to all 14 SC-FDMA symbols in a subframe. This is illustrated by FIG. 9, which is a block diagram of an exemplary logic flow diagram implemented by a baseband processor 190 that illustrates the operations for frequency error correction for LTE uplink in a system with collocated antennas. The operations may be considered to be an exemplary method, a result of execution of computer program instructions embodied on a computer readable memory, and/or functions performed by logic implemented in hardware, in accordance with exemplary embodiments of this invention. This is also illustrated graphically by FIG. 10, which is a block diagram that illustrates mathematical operations for frequency offset correction in accordance with an exemplary embodiment of the instant invention. FIGS. 9 and 10 point out that FOC (e.g., FOC 660 as illustrated in FIG. 6 and graphically illustrated in FIG. 7) is split into two stages, a first (1st) stage FOC 925 that is performed corresponding to each of the N antennas and a second ($2^{nd}$) stage FOC 960 that is performed after IDFT 650. The output signal 927 of a first stage FOC 925 is a frequency-offset corrected signal. The signal 935 includes CE information and the signal 927. For collocated antennas using an average FO $\Delta f$, the output results 970 of FIG. 9 should be equivalent to the output results 670 of FIG. 6.

Figure 11:
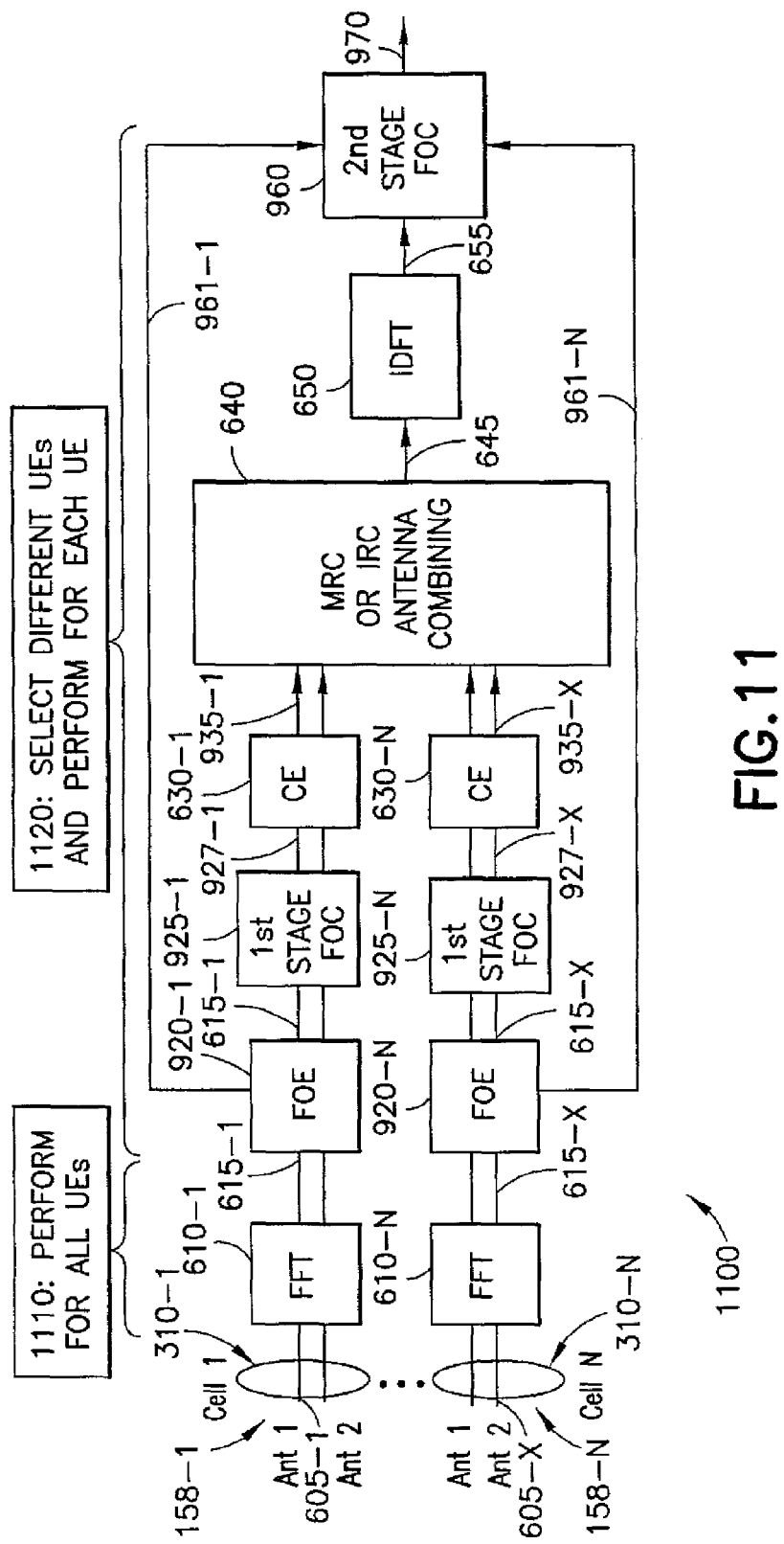
FIG. 11 is a block diagram of an exemplary logic flow diagram implemented by a baseband processor that illustrates the operations for frequency error correction for LTE uplink CoMP, where the operations may be considered to be an exemplary method, a result of execution of computer program instructions embodied on a computer readable memory, and/or functions performed by logic implemented in hardware, in accordance with exemplary embodiments of this invention.

Turning to FOC for a CoMP system, and to FIG. 11, this figure is a block diagram 1100 of an exemplary logic flow diagram implemented by a baseband processor that illustrates the operations for frequency error correction for LTE uplink CoMP, where the operations may be considered to be an exemplary method, a result of execution of computer program instructions embodied on a computer readable memory, and/or functions performed by logic implemented in hardware, in accordance with exemplary embodiments of this invention. FOC for a CoMP system is achieved in two stages (see FIG. 11): (1) the first FOC stage 920-1 through 925-N is based on per cell $e^{j\Phi(p)}$ that is calculated (by the corresponding FOE 920-1 through 920-N) using associated $\Delta f_c$ and applied to all SC-FDMA symbols before corresponding CE 630-1 to 630-N and antenna combining 640; (2) the second FOC stage 960 is based on $e^{j\Psi(m)}$ that is calculated with averaged FOE over all cells in CoMP operation and applied to all data QAM symbols after antenna combining 640 and IDFT 650. Exemplary FOE techniques include the techniques presented in Hyunsoo Cheon, "Frequency Offset Estimation for High Speed Users in E-Utra Uplink", the 18th Annual IEEE International Symposium on Personal, Indoor and Mobile Radio Communications (PIMRC'07) (2007). Since the $2^{nd}$ stage FOC 960 uses the averaged FOE, this stage is suboptimum for the same issue of traditional post-IDFT FOC. However, due to the fact that the contribution of $e^{j\Psi(m)}$ is significantly small compared with $e^{j\Phi(p)}$, this two-stage FOC structure delivers significant performance improvement for CoMP as shown in simulation results below. This also illustrates that the second stage FOC 960 is optional. For FIG. 10 as this is applied to the frequency correction of FIG. 11, the Stage 1 FOC shown in FIG. 10 is one of the first stage FOCs 925-1 through 925-N. That is, each of the first stage FOC 925 performs calculations using phase $e^{j\Phi(p)}$ for a $\Delta f_c$ corresponding to a cell 310. In this example, the second stage FOC 960 receives all N $\Delta f_f$ and determines the average $\Delta f$ shown in FIG. 10 and used in the second stage FOC 960. It is noted that the blocks in FIG. 11 may be implemented by a baseband processor 190 as shown in FIG. 1. Also, although two antennas are shown for each cell, this is a simplification and each cell may include one or more antennas and the number of antennas per cell need not be the same (as shown in FIG. 2). It is noted that the logic operations in FIG. 11 will typically, in practice, be performed by a single integrated circuit (such as an application-specific integrated circuit, e.g., a processor 150). However, it may be possible to perform these logic operations using multiple integrated circuits.

It is noted that the FFTs 610-1 through 610-N are performed for all UEs at the same time (as illustrated by reference 1110), whereas the FOEs 920-1 through 920-N, and the first stage FOCs 925-1 through 925-N, the CE 630-1 through 630-N, antenna combining 640, IDFT 650, and second stage FOC 960 are performed for each UE (as illustrated by reference 1120) separately. For a particular UE, say a desired UE, the antenna combining 640 treats other UEs as interferers and reduces their impact on the desired UE. Similarly, FIG. 10 shows 2-stage FOC for a desired UE, where one can consider the other UEs using the PRB structure as interferers whose impact will be reduced by antenna combining in the frequency domain.

5. MCLS for LTE Uplink with CoMP

Figure 12:
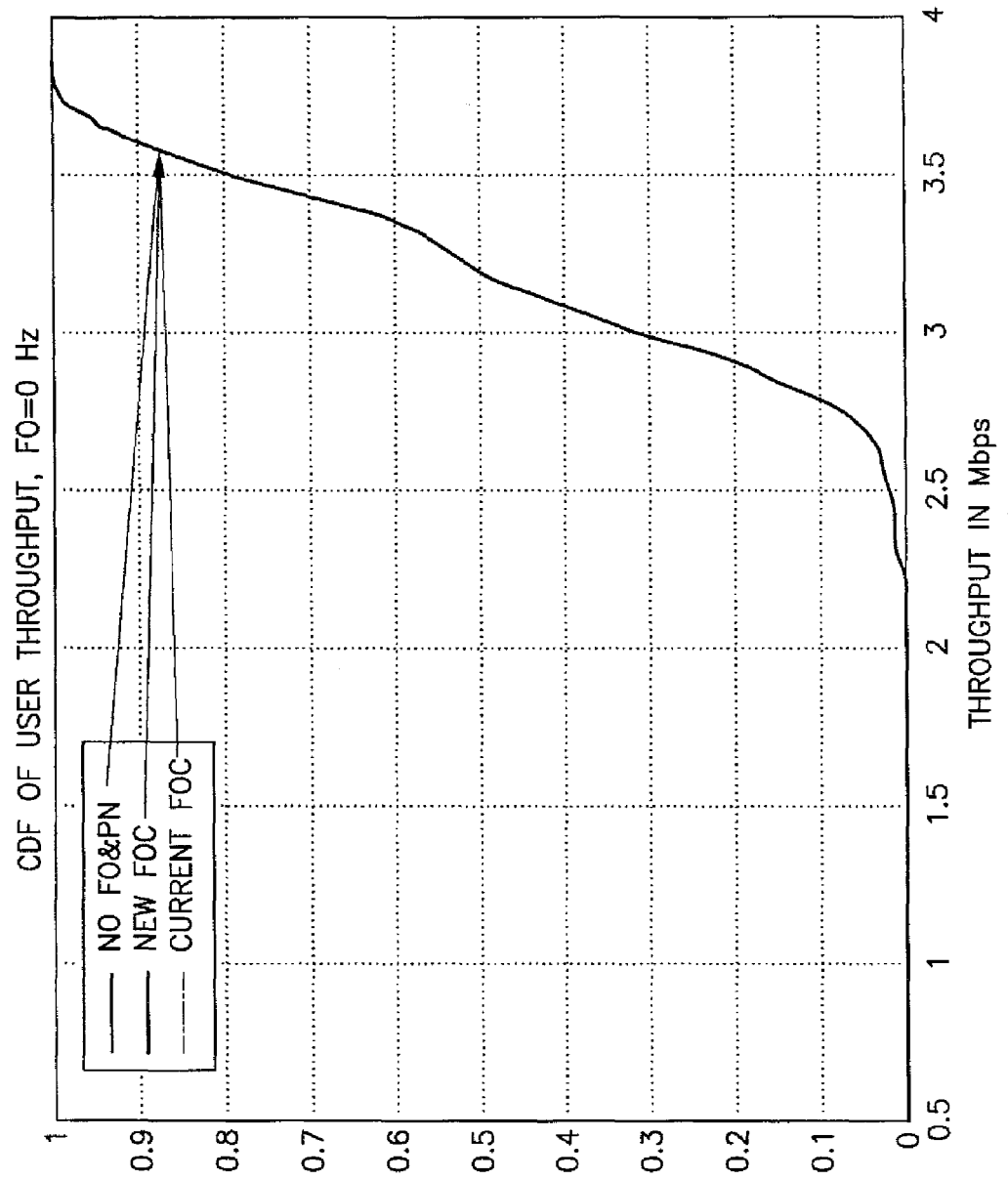
FIGS. 12-15 are graphs illustrating CDF of user throughput for various frequency offsets.
Figure 13:
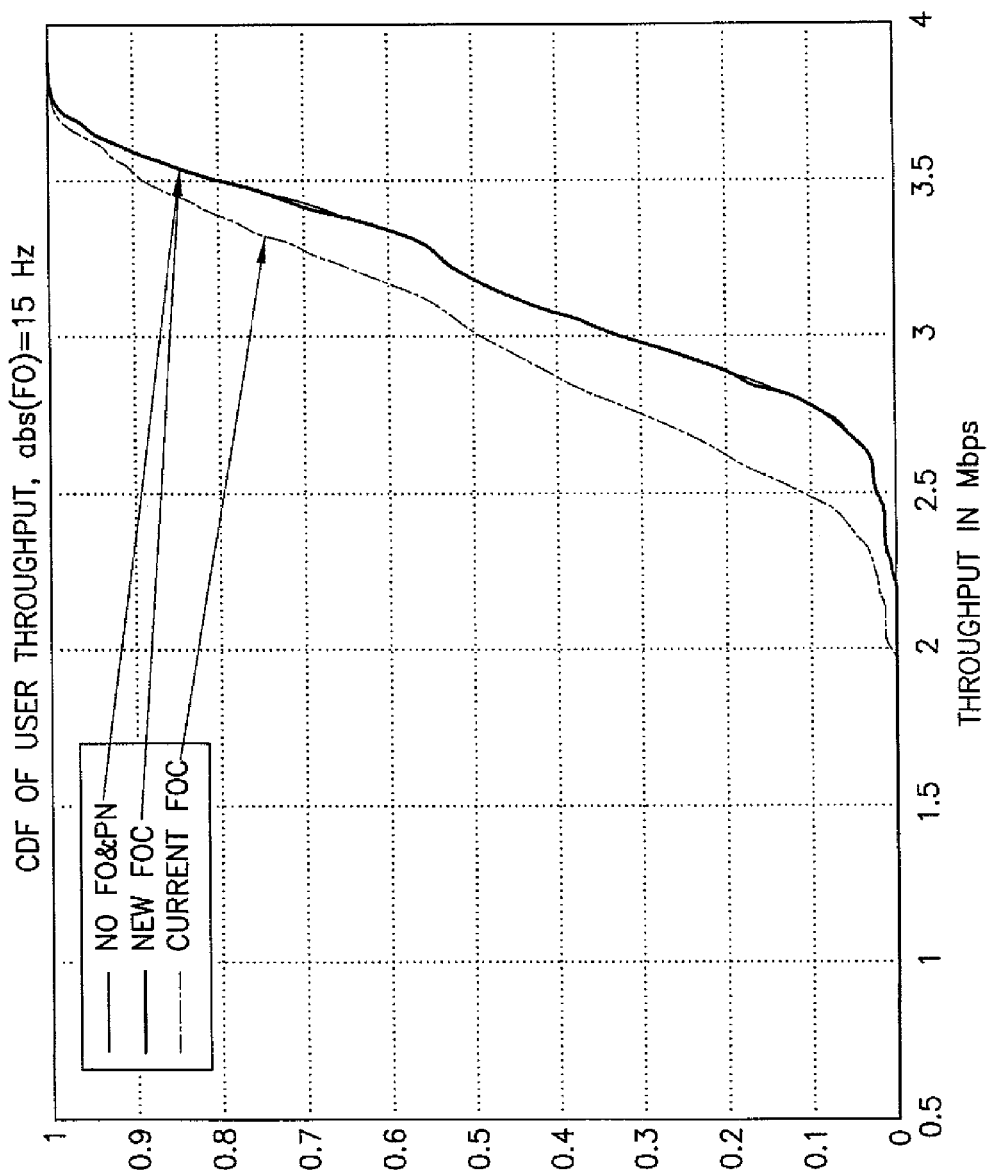
Figure 14:
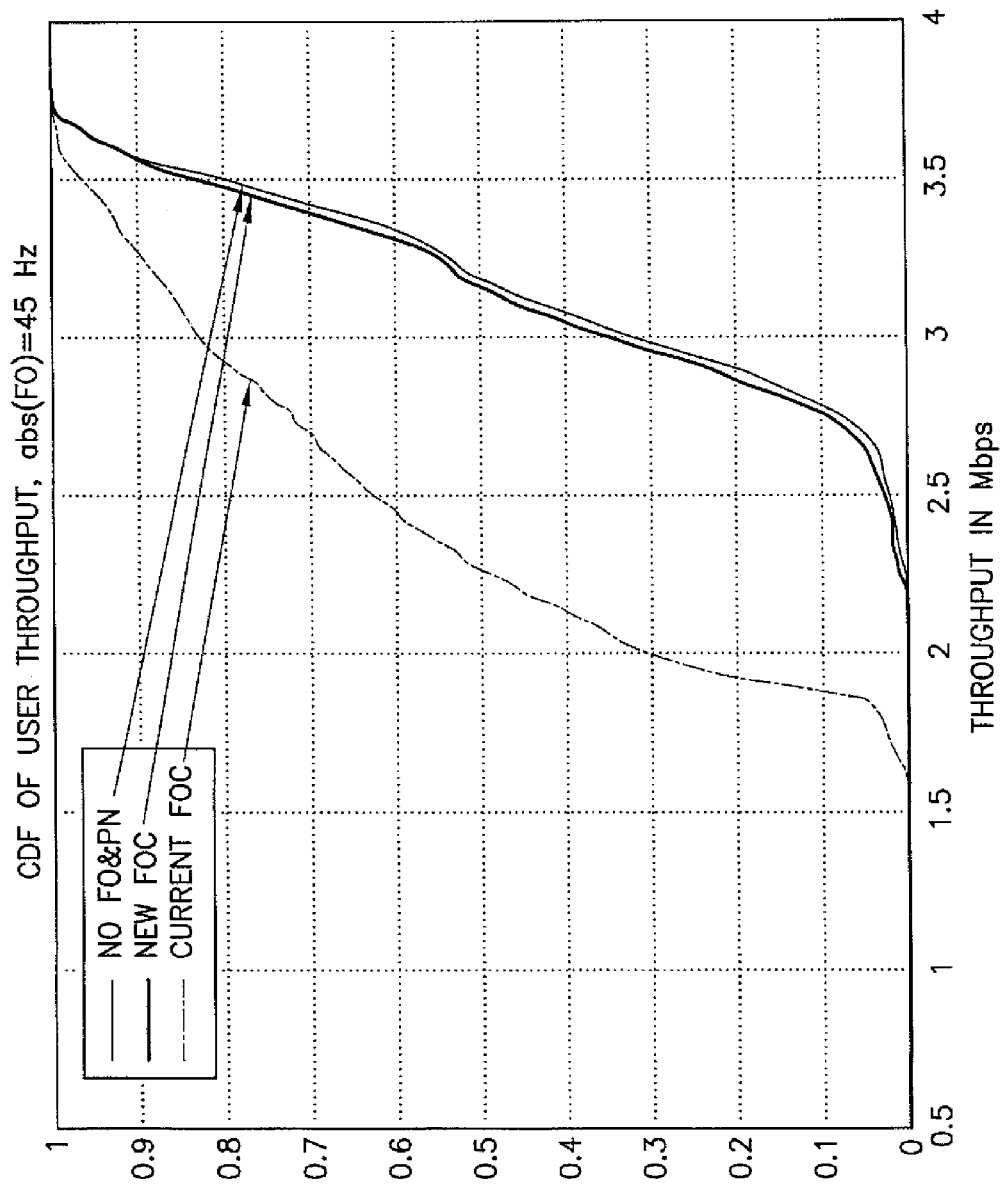
Figure 15:
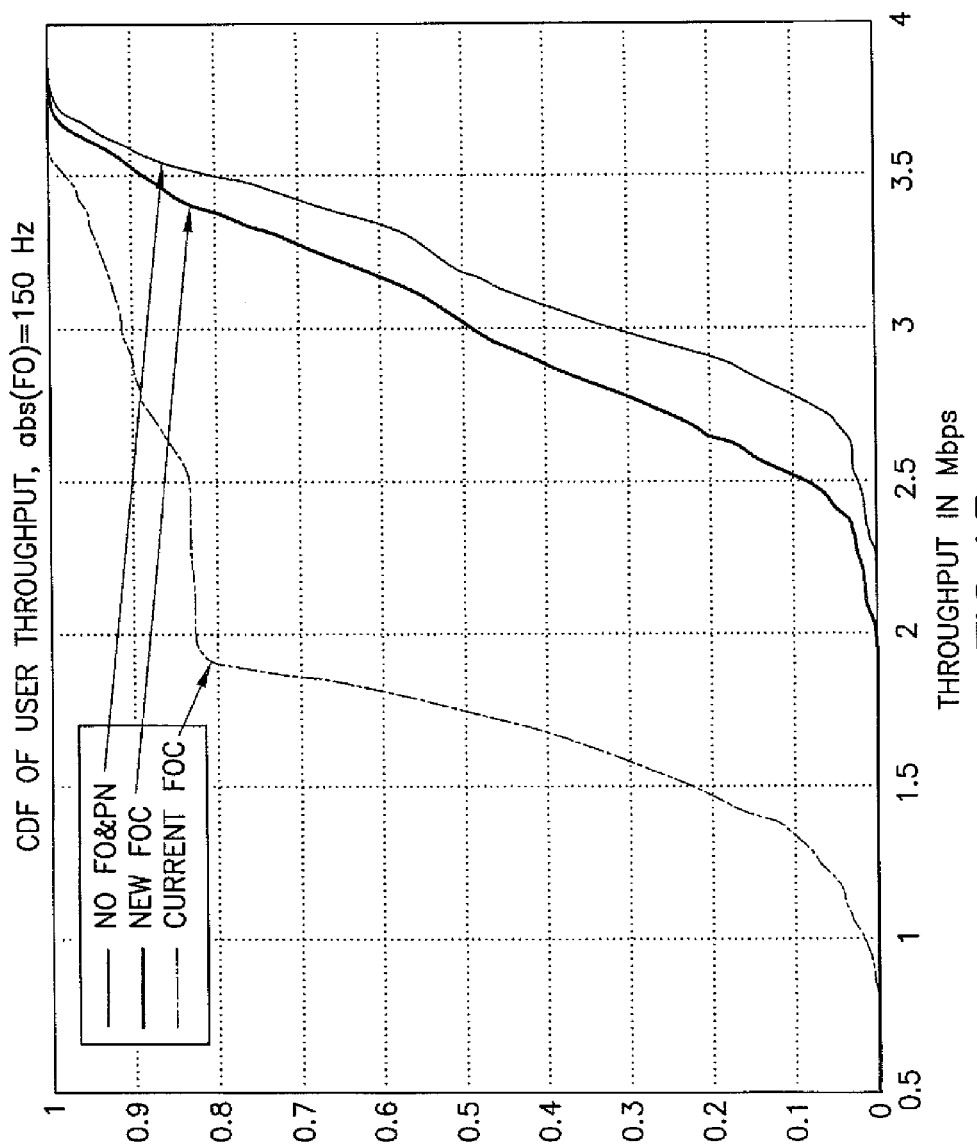

FIGS. 12-15 are graphs illustrating CDF of user throughput for various frequency offsets. Results were generated using 8-cell multi-user link simulation with random FO indicated in each figure. That is, for desired UE, each of the 8 cells sees a FO that is a random number in practice. In the simulation, abs(FO)=15 Hz means actual FO seen by a cell for the desired UE is either 15 Hz or −15 Hz, where the sign is randomly determined in the simulation. The reference ("No FO&PN") is an ideal scenario that does not have either phase noise or FO. The "Current FOC" was calculated using the techniques described above in reference to FIGS. 7 and 8. The "New FOC" was calculated using the techniques described above in reference to FIGS. 10 and 11. In FIG. 12 (FO=0, zero, Hz), each of the three curves is basically indistinguishable. The CDF means that about 30 percent of users get 3 Mbps or less of throughput. In FIG. 13 (abs (FO)=15 Hz, where abs( ) is absolute value), a gap develops between the curve for the Current FOC and the curve for the New FOC, although the differences are small between the curves for the New FOC and the No FO&PN. FIG. 14 (abs(FO)=45 Hz) shows a similar situation. In FIG. 15 (abs(FO)=150 Hz), the gap is large between the curve for the Current FOC and the curve for the New FOC, although the differences become more significant between the curves for the New FOC and the No FO&PN. The gap between the New FOC and the No FO&PN in FIG. 15 (and previous figures) is due to ICI and suboptimal second stage FOC.

Antenna combining across cells has the potential issue of the receiver having to handle different frequency offsets on different cells. Current receivers show significant performance loss due to joint estimation and correction approach across all antennas. A new FOC technique proposed herein shows significant improvement. The exemplary embodiments of the invention can be applied to any IRC receiver with multiple antennas having different FO, such as CRAN, DRAN and small cell systems.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 155 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third Generation Partnership Project
CDF Cumulative Distribution Function
CoMP Coordinated Multipoint
CP Cyclic Prefix
CRAN Cloud Radio Access Network
dB Decibel
DFT Discrete Fourier Transform
DRAN Density Radio Access Network
eNB enhanced (or evolved) Node B (e.g., LTE base station)
FFT Fast Fourier Transform
FOC Frequency Offset Correction
FOE Frequency Offset Estimate (or Estimation)
FO Frequency Offset
ICI Inter-Carrier Interference
IDFT Inverse Discrete Fourier Transform
IRC Interference Rejection Combining
LTE Long Term Evolution
MCLS Multi-Cell Link Simulator
Mbps Megabits per second
MIMO Multiple Input, Multiple Output
MRC Maximum Ratio Combining
ms millisecond
OFDM Orthogonal Frequency Division Multiplex (or Multiplexing)
OFDMA Orthogonal Frequency Division Multiple Access
PDS Power Density Spectrum
PL Path Loss
PLL Phase-Locked Loop
PN Phase Noise
PRB Physical Resource Block
RF Radio Frequency
RRFH Remote RF Head
Rx Reception or Receiver
SC-FDMA Single Carrier Frequency Division Multiplexing Access
Tx Transmission or Transmitter
UE User Equipment
UL UpLink
ZC Zadoff-Chu

What is claimed is:

1. A method, comprising:
for a signal transmitted by a selected user equipment and received by a plurality of antennas from a plurality of radio heads, wherein one or more antennas provide coverage to each of a plurality of cells, and wherein each signal is received by an individual one of the antennas, performing the following:
estimating carrier frequency offset for each cell using one or more of the signals from the cell;
performing frequency offset correction on each signal from each cell by using at least the estimated carrier frequency offset for an associated cell;
estimating a channel for each frequency offset corrected signal; and
combining, using the estimated channels, each of the frequency offset corrected signals to generate one or more estimates of one or more symbols transmitted from the selected user equipment.

2. The method of claim 1, wherein each carrier frequency offset corresponds to a difference between a carrier received by a receiver in an individual one of the cells and a carrier transmitted by a transmitter in the user equipment.

3. The method of claim 1, wherein each signal is a frequency-domain signal, and wherein performing frequency offset correction further comprises multiplying, for each of the frequency-domain signals, selected symbols of a physical resource block in a subframe of a corresponding frequency-domain signal by a phase factor corresponding to an estimated carrier frequency offset for a cell corresponding to the frequency-domain signal.

4. The method of claim 3, wherein multiplying further comprises multiplying the selected symbols of the physical resource block in the frequency-domain signal by the phase factor of $e^{-j\Phi(p)}$, where $\Phi(p)=2\pi\Delta f_c T_s[(p-1)N+pN_{CP}^{(p)}]$, and where $\Delta f_c$ is an estimated carrier frequency offset for a cell c corresponding to the frequency-domain signal, $T_s$ is a sample interval, p is an index of symbols in the physical resource block, N is a system fast Fourier transform size, and $N_{cp}$ is number of samples of cyclic prefix in a symbol.

5. The method of claim 4, further comprising performing, for each frequency-domain signal, a discrete Fourier transform to convert a time-domain digital signal for a corresponding antenna into the frequency-domain signal, wherein each discrete Fourier transform has the size of N.

6. The method of claim 1, further comprising performing an inverse discrete Fourier transform to generate time-domain versions of the one or more estimates of the one or more symbols transmitted from the selected user equipment.

7. The method of claim 6, further comprising performing a second frequency offset correction on the time-domain versions of the one or more estimates by multiplying selected symbols of a physical resource block in a subframe of a corresponding frequency-domain signal by a second phase factor corresponding to an average of the estimated carrier frequency offsets, the second frequency offset correction further generating time-domain versions of the one or more estimates of the one or more symbols transmitted from the selected user equipment.

8. The method of claim 7, wherein multiplying the selected symbols of the physical resource block in the subframe by the second phase factor further comprises multiplying the selected symbols of the physical resource block in the subframe by the second phase factor of $e^{-j\Psi(m)}$, where $\Psi(m)=2\pi\Delta f_{norm}m/M$, where $\Delta f_{norm}$ is the average of the estimated carrier frequency offsets, m is a time index, and m=−M/2, −M/2+1, . . . , 0, 1, . . . , M/2−1.

9. The method of claim 1, further comprising selecting a different user equipment and performing at least the estimating carrier frequency offset, the performing frequency offset correction, the estimating a channel, and the combining for the different user equipment, wherein discrete Fourier transforms to convert time-domain digital signals for antennas into frequency-domain signals are performed for all user equipment.

10. An apparatus, comprising:
one or more processors; and
one or more memories including computer program code, the one or more memories and the computer program code configured, with the one or more processors, to cause the apparatus to perform at least the following:
for a signal transmitted by a selected user equipment and received by a plurality of antennas from a plurality of radio heads, wherein one or more antennas provide coverage to each of a plurality of cells, and wherein each signal is received by an individual one of the antennas, performing the following:

estimating carrier frequency offset for each cell using one or more of the signals from the cell;

performing frequency offset correction on each signal from each cell by using at least the estimated carrier frequency offset for an associated cell;

estimating a channel for each frequency offset corrected signal; and combining, using the estimated channels, each of the frequency offset corrected signals to generate one or more estimates of one or more symbols transmitted from the selected user equipment.

11. The apparatus of claim 10, wherein each carrier frequency offset corresponds to a difference between a carrier received by a receiver in an individual one of the cells and a carrier transmitted by a transmitter in the user equipment.

12. The apparatus of claim 10, wherein each signal is a frequency-domain signal, and wherein performing frequency offset correction further comprises multiplying, for each of the frequency-domain signals, selected symbols of a physical resource block in a subframe of a corresponding frequency-domain signal by a phase factor corresponding to an estimated carrier frequency offset for a cell corresponding to the frequency-domain signal.

13. The apparatus of claim 12, wherein multiplying further comprises multiplying the selected symbols of the physical resource block in the frequency-domain signal by the phase factor of $e^{-j\Phi(p)}$, where $\Phi(p)=2\pi\Delta f_c T_s[(p-1)N+ pN_{CP}^{(p)}]$, and where $\Delta f_c$ is an estimated carrier frequency offset for a cell c corresponding to the frequency-domain signal, $T_s$ is a sample interval, p is an index of symbols in the physical resource block, N is a system fast Fourier transform size, and $N_{CP}$ is number of samples of cyclic prefix in a symbol.

14. The apparatus of claim 13, further comprising performing, for each frequency-domain signal, a discrete Fourier transform to convert a time-domain digital signal for a corresponding antenna into the frequency-domain signal, wherein each discrete Fourier transform has the size of N.

15. The apparatus of claim 10, further comprising performing an inverse discrete Fourier transform to generate time-domain versions of the one or more estimates of the one or more symbols transmitted from the selected user equipment.

16. The apparatus of claim 15, further comprising performing a second frequency offset correction on the time-domain versions of the one or more estimates by multiplying selected symbols of a physical resource block in a subframe of a corresponding frequency-domain signal by a second phase factor corresponding to an average of the estimated carrier frequency offsets, the second frequency offset correction further generating time-domain versions of the one or more estimates of the one or more symbols transmitted from the selected user equipment.

17. The apparatus of claim 16, wherein multiplying the selected symbols of the physical resource block in the subframe by the second phase factor further comprises multiplying the selected symbols of the physical resource block in the subframe by the second phase factor of $e^{-j\Psi(m)}$, where $\Psi(m)=2\pi\Delta f_{norm}m/M$, where $\Delta f_{norm}$ is the average of the estimated carrier frequency offsets, m is a time index, and m=$-M/2,-M/2+1,\ldots,0,1,\ldots,M/2-1$.

18. The apparatus of claim 10, further comprising selecting a different user equipment and performing at least the estimating carrier frequency offset, the performing frequency offset correction, the estimating a channel, and the combining for the different user equipment, wherein discrete Fourier transforms to convert time-domain digital signals for antennas into frequency-domain signals are performed for all user equipment.

19. A computer program product comprising a non-transitory computer-readable medium comprising computer-readable code, which when executed by one or more processors of an apparatus causes the apparatus to perform at least the following:

for a signal transmitted by a selected user equipment and received by a plurality of antennas from a plurality of radio heads, wherein one or more antennas provide coverage to each of a plurality of cells, and wherein each signal is received by an individual one of the antennas, performing the following:

estimating carrier frequency offset for each cell using one or more of the signals from the cell;

performing frequency offset correction on each signal from each cell by using at least the estimated carrier frequency offset for an associated cell;

estimating a channel for each frequency offset corrected signal; and combining, using the estimated channels, each of the frequency offset corrected signals to generate one or more estimates of one or more symbols transmitted from the selected user equipment.

20. The computer program product of claim 19, wherein each carrier frequency offset corresponds to a difference between a carrier received by a receiver in an individual one of the cells and a carrier transmitted by a transmitter in the user equipment.

* * * * *